United States Patent Office 3,023,051
Patented Feb. 27, 1962

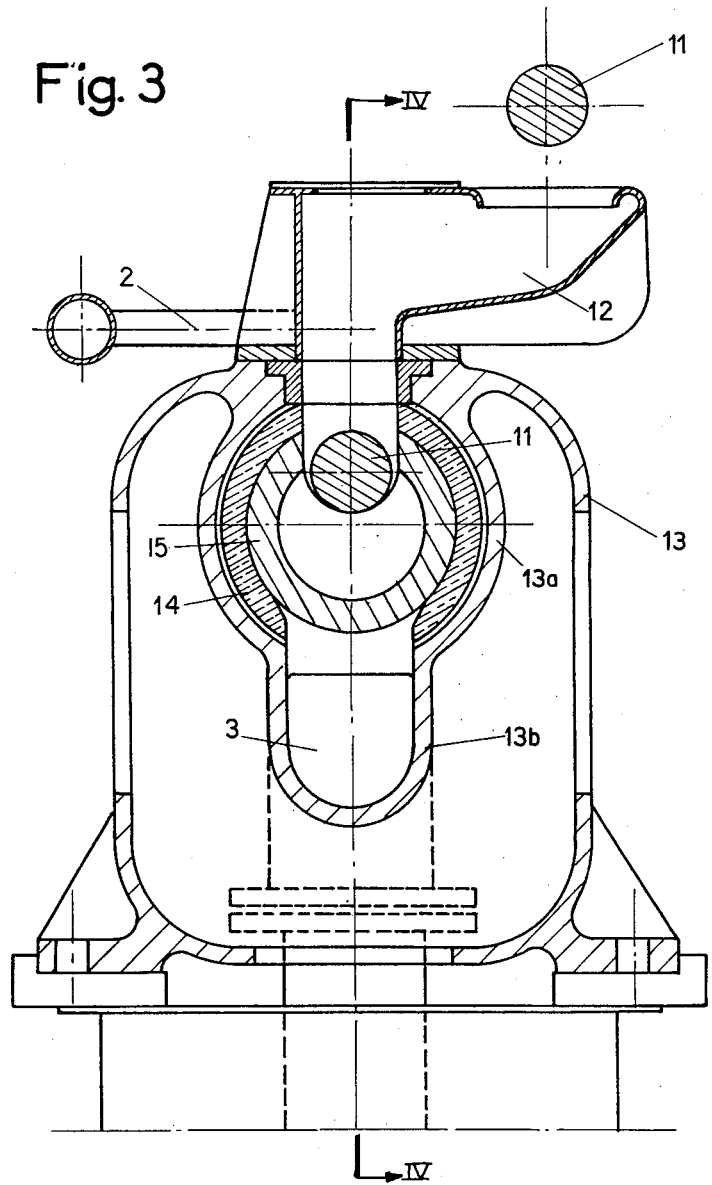

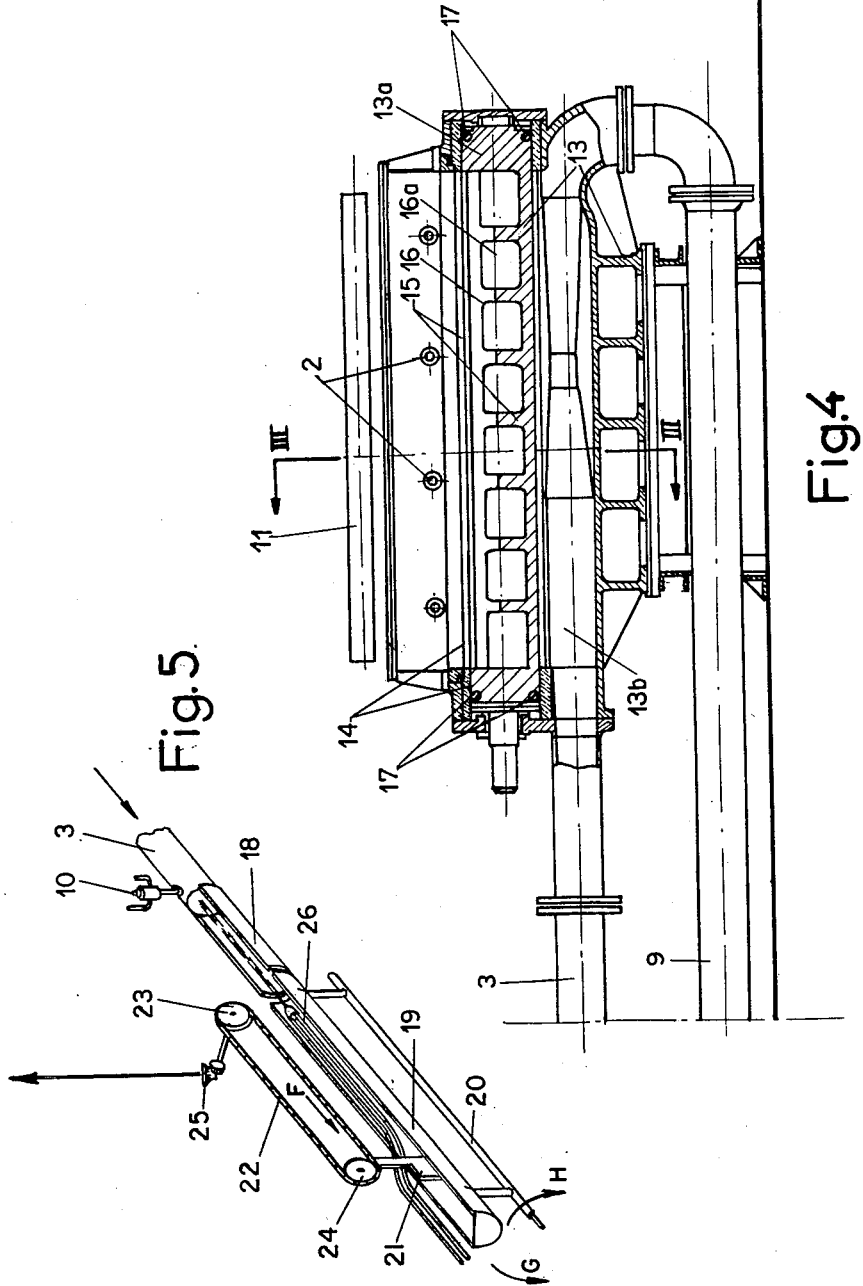

3,023,051
INSTALLATION FOR HYDRAULIC CONDUIT
TRANSPORT FOR CONTAINER
Elie Condolios and Andre Michel, Grenoble, France, assignors to Commissariat a l'Energie Atomique, Paris, France
Filed Aug. 19, 1959, Ser. No. 834,720
Claims priority, application France Aug. 30, 1958
10 Claims. (Cl. 302—14)

Containers of dangerous products such as explosives, radioactive bodies etc., must be handled from a distance to ensure the safety of personnel responsible for their maintenance.

Consequently the transport of such containers raises various problems which are difficult to solve in a simple and economical manner.

Furthermore, if the containers enclose toxic products, it is necessary to provide the installation with sealing devices which make it possible to introduce the containers into the transport circuit while preventing escape of the contaminated atmosphere of the space from which they are removed, to the outside through the circuit.

The present invention relates to an installation for the hydraulic transport of containers.

The installation in accordance with the invention is essentially characterized in that there are provided on the hydraulic transport circuit a lock chamber for the introduction of the containers into the circuit, the lock chamber being constituted by a rotating throttle sealed with respect to the exterior atmosphere and comprising on its periphery a cavity which alternately faces the container distributing devices and the transport conduit, and a receiving device constituted by a mechanical and hydraulic brake provided with a swinging system to place the container into a storage chamber after conveyance.

The installation which will be described hereafter in order to illustrate the invention is designed for the transport of irradiated uranium bars; in effect the transport of such bars poses numerous problems due to their high radio-activity, which necessitates special security measures, in particular the location of the whole transport device under a layer of several metres of earth, concrete, water, etc., in order to protect the personnel from radiation.

After they are taken out of the reactor, the uranium bars are placed in containers having the form of metallic cylindrical sheaths, whose length may be of the order of 15 to 20 times their diameter and whose ends are immediately contracted and welded so as to ensure complete tightness of the sheaths.

The sheaths are then taken from the table of the welding machine and conveyed on a ramp, to be thereafter introduced into the entry circuit of the transport circuit.

Of course, all these operations are effected automatically without the intervention of personnel and in an efficiently protected chamber.

The atmosphere of the chamber in which these operations are carried out is contaminated upon contact with the uranium bars and this makes it necessary to provide an efficient device at the entry of the conduit to avoid introducing the contaminated atmosphere into the hydraulic circuit when the sheaths are introduced therein and to prevent contamination of the water used as transport medium.

The transport of radioactive uranium bars involves another problem due to the rapid heating of the bars once they are introduced into the sheaths to avoid contamination of the fluid, the heating effect being so high that there is danger of melting of the sheaths if they are not subjected to strong cooling.

The installation in accordance with the invention solves in a simple and effective manner the difficult problems involved in the transport of sealed sheaths containing the radioactive uranium bars, in that:

(1) The combined use of a lock chamber and of hydraulic transport ensures in a simple manner sealing of the departure chamber, namely, the chamber in which the bars are placed in the sheaths, from the transport circuit.

(2) No sealing device need be provided at the exit of the hydraulic transport conduit.

(3) The liquid used as hydraulic conveyor medium effects at the same time strong cooling of the sheaths.

(4) The hydraulic transport conduits may conveniently be buried under several metres of earth, to ensure effective protection of the personnel. In effect, the pumps, which are the only mechanical devices which require supervision and maintenance, may be installed at a location sufficiently removed from the transport conduits, which location does not require any particular protection and is consequently easily accessible.

Furthermore, it will be noted that the hydraulic transport system in accordance with the invention is of particular interest in the present case because, besides the above listed advantages, it will be seen that the liquid used in the transport installation, namely, water, may be taken from the pool where the bars are stored after transport; contamination of the water and of the pumps is avoided by the fact that the bars are enclosed in a sealed sheath and are introduced by means of a lock chamber which ensures tightness of the departure chamber.

This greatly simplifies the device through which the sheaths arrive into the pool; since no sealing device is necessary at the exit of the hydraulic transport conduit, it is sufficient to provide a mechanical and hydraulic brake for receiving the sheaths at the end of the conduit into the pool.

A non-limitative embodiment of an installation for hydraulic conduit transport of containers in accordance with the invention will be described hereafter with reference to the accompanying drawings. Specific features of the embodiments described are to be considered as part of the invention, it being understood that any equivalent features may be utilized within the scope of the invention.

FIGURE 3 is a cross-section on line III—III of FIGURE 4 of the lock chamber in accordance with the invention.

FIGURE 4 is a section along line IV—IV of FIGURE 3.

FIGURE 5 is a schematical perspective view of the braking and receiving device for the containers.

The drawings only illustrate the elements necessary to an understanding of the invention and corresponding elements in the several figures are indicated by the same reference numerals.

Figure 1:
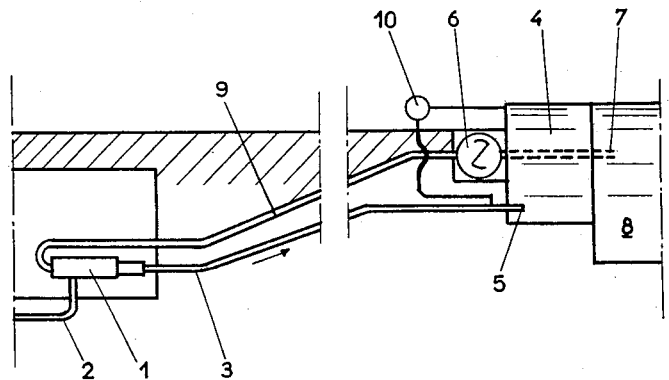
FIGURE 1 is a schematical, vertical section of an installation in accordance with the invention.
Figure 2:
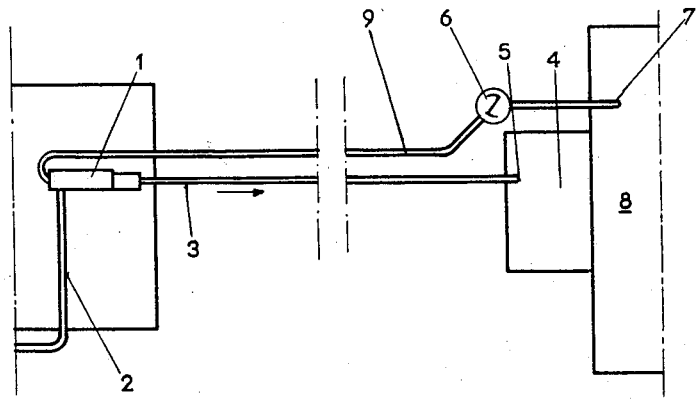
FIGURE 2 is a horizontal section of the embodiment of FIGURE 1.

A diagram of the general transport installation is shown in FIGURES 1 and 2.

The installation comprises a lock chamber 1 for the introduction of the sheaths, provided with an overflow evacuation conduit 2; a conduit 3 for the transport of the sheaths, which is connected to the lock chamber 1; an arrival basin 4 into which opens the end 5 of conduit 3; a motor-pump group 6, at a location easily accessible for maintenance and supervision, comprising on the one hand a feed conduit 7 which places the group in communication with the storage pool 8 for the bars and on the other hand on a delivery conduit 9 connected to the lock chamber 1; an electric contact differential manometer 10 which detects the passage of the sheaths and counts them; and a braking device at the end 5 of conduit 3, illustrated in FIGURE 5.

As shown in FIGURE 1 the transport installation is completely buried under several metres of earth, in order to protect the personnel from radiation, the lock chamber 1 being at a lower level than the entry into the storage pool 8, so that the entry is under several metres of water.

The sheaths which are transported are constituted by sealed metallic cylinders whose dimensions are, for example: length 1.4 m., diameter 75 mm., and weight 20 kgs. approximately.

The operation of the transport installation in accordance with the invention is as follows:

After the ends of the sheath 11 (FIGURE 3) are welded, the latter is carried on a distribution ramp 12, for introduction into the lock chamber 1.

The lock chamber comprises (FIGURES 3 and 4) a housing 13 of stainless cast iron whose central portion is U-shaped; the U is constituted by an upper cylindrical envelope 13a and a lower cylindrical envelope 13b connected to the transport conduit 3; a cylindrical intermediate sleeve 14 made of bronze; a cylindrical bronze throttle 15 comprising a longitudinal cavity 16 adapted to receive a sheath; the throttle 15 may rotate in the sleeve 14 to seal off the transport fluid from the exterior of the lock chamber 1; the interior of the throttle 15 is divided into several compartments 16a (FIGURE 4) whose upper parts situated adjacent the cavity 16 communicate between them through the cavity; when it is introduced into the cavity 16 the sheath 11 rests on the cylindrical surfaces between the compartments 16a; an overflow 2 provided to evacuate after each introduction of a sheath the water contained in the cavity 16, introduced therein from the conduit during a preceding operation, said water having been contaminated superficially by contact with the atmosphere of the chamber while the sheath was introduced.

The overflow serves also to evacuate the inevitable leaks which occur either during the introduction of the sheaths, or during operation, and which may be as high as 0.5 litres per second.

The cavity 16 of the throttle 15 is adapted to receive a sheath 11 from the supply ramp 12.

Annular packings 17 (FIGURE 4) ensure a seal between the throttle chamber and its support.

During each introduction a quantity of water equal to the volume of the sheath and constituting almost all of the water contained in the cavity 16, and which has been introduced therein during a preceding operation, is evacuated through the overflow.

Arrival of the sheath into the lock chamber causes slow rotation of the throttle (speed of rotation 1.5 r.p.m.) during which the sheath is swung into the lower portion 13b of the lock chamber, which is connected to the transport conduit. The rotation is stopped automatically when the throttle comes back into its original position after a complete turn.

The starting system is not shown in the drawings for the sake of clarity; the system comprises a suitable electrical circuit which is closed by the metallic sheath in order to start the motor which drives the throttle.

During the swinging operation, namely during the first half-turn of the throttle, the small quantity of water which still remains in the cavity 16 is carried away by leaks of the device and evacuated by the overflow 2, so that no contaminated water is reintroduced into the circuit and into the storage pool 8.

The throttle 15 is driven by a shaft which passes through one of the concrete walls of the departure chamber and extends with appropriate sealing means into a lateral chamber which is easily accessible and in which is located the driving motor (not shown).

The lower portion 13b of the lock chamber which forms one of the ends of the transport conduit has a total flow section slightly smaller than the transport conduit so as to accelerate the introduction of the sheath into the conduit.

The lock chamber 1 comprises the necessary sealing means (intermediate sleeve 14 and joints 17) in order to reduce to a minimum the leaks either during waiting position or during its operation.

The transport conduit 3 in which is conveyed the sheath after it passes through the lock chamber has suitable characteristics (radius of curvature, rising slant and flow speed of the water) in order to transport the sheath.

FIGURE 1 also shows the device for detecting the passage of each sheath and for counting, which is constituted by an electric contact differential manometer 10. For this purpose one of the membranes of the manometer is connected to the transport conduit 3 slightly upstream of the arrival basin, the other membrane (reference membrane) being connected to the arrival basin 4. Pressure against the two membranes is normally the same, but the passage of a sheath through the conduit past the first membrane causes an increase of pressure on the latter, thus deforming the second membrane which acts on an electric contact to control a light signal to indicate the passage of the sheaths and on a counter to count the same.

Exit of the sheath at the end 5 of conduit 3 is into an arrival basin 4 situated immediately upstream of the storage pool 8 into which the sheath exits under water, under a mean load of approximately 4 metres of water.

More precisely the transport conduit 3 ends in a container receiving and braking device (FIGURE 5) disposed in the interior of the arrival basin 4. The device comprises a fixed horizontal spout 18 secured to the conduit 3, a movable channel 19 equally horizontal and aligned with the spout 18; the channel 19 is fixed to a shaft 20 parallel to the long axis of the spout. The shaft 20 is rotated by means of a motor, not shown in the drawing, which is controlled by the operator when the sheath is well in place in the channel 19.

The sheath is correctly placed in the channel 19 by a system comprising a flexible finger 21 secured to a chain 22 mounted on two sprockets 23 and 24. Sprocket 23 is connected to a motor, not shown in the drawings, through a transmission 25, shown schematically in FIGURE 5; sprocket 24 idles on its shaft. At the exit from conduit 3 the sheath is braked until it is fully stopped, on the one hand by friction on the spout 18 and channel 19 and on the other hand by one or more water jets which strike the moving container on its downstream face; the water jet is supplied by a suitable nozzle not shown in FIGURE 5 and disposed in the interior of the arrival basin 4.

The sheath thus finds itself partly in the movable channel 19 and partly in the fixed spout 18; rotation of the channel 19 about its shaft 20 would shear the sheath and damage the apparatus.

The operator then starts the flexible finger 21 which by moving in the direction of arrow F pushes the sheath until the latter is completely out of the fixed spout 18 and thus lies completely in the movable channel 19; the operator stops the finger when it reaches the upper run of the chain and swings the channel 19 in the direction of either arrow G or arrow H according to whether the sheath containing the bar is in good or bad condition.

The sheath falls on an inclined plane not shown and rolls towards a storage device.

All these operations are controlled individually by operators provided with periscopes.

Of course, the invention is not limited to the embodiment illustrated and described, but embraces within its scope various possible modifications.

The embodiments of the invention in which an exclusive property or privilege is claimed are defined as follows:

1. In an installation for hydraulically transporting containers, a lock chamber for receiving containers to be transported, an arrival basin for receiving transported containers, a conduit for said containers connecting said lock chamber with said basin, piping and pumping means for moving a liquid from said lock chamber into said basin through said conduit, said lock chamber including a housing, upper and lower parts for said housing, a rotary throttle mounted in said housing, a supply ramp on said housing receiving containers for admission into said housing, a cavity in said throttle for receiving a container, means for rotating said throttle and said cavity alternately from positions opening toward said ramp and opening toward said lower part of said housing, said lower part of said housing being in communication with said conduit and braking means at said basin at the discharge end of said conduit slowing the movement of a container as it discharges into said basin.

2. In an installation as described in claim 1, a cylindrical sleeve within said housing, said throttle being rotatably and tightly mounted in said sleeve.

3. In an installation as described in claim 1, a plurality of axially disposed compartments in said throttle opening into said cavity.

4. An installation as described in claim 1 in which said braking means includes at least one nozzle directing fluid under pressure against the outlet of said conduit within said basin.

5. An installation as described in claim 1 in which said braking means includes a spout fixed coaxially with the outlet of said conduit within said basin, said spout frictionally engaging a container when the container enters said spout.

6. An installation as described in claim 1 in which said braking means includes a movable channel coaxial with the outlet of said conduit within said basin, said channel frictionally engaging a container when the container enters said channel and means for pivoting said channel towards the bottom of said basin.

7. An installation as described in claim 1 in which said braking means includes a spout fixed coaxially with the outlet of said conduit within said basin, a pivotable channel downstream of and arranged coaxially with said spout, said spout and said channel frictionally engaging a container when the container enters said spout and said channel and means for pivoting said channel toward the bottom of the basin.

8. An installation as described in claim 7 including a flexible finger and means for moving said finger longitudinally in said channel.

9. An installation as described in claim 1 including a source of water connected to the inlet of said piping and pumping means, the outlet of said piping and pumping means being connected to said lock chamber.

10. An installation as described in claim 1 including a differential manometer of the membrane type connected between said conduit and said basin, an electric switch actuated by said manometer, a signal light actuated by said switch and a counter of the number of containers passing through said conduit actuated by said manometer.

References Cited in the file of this patent

UNITED STATES PATENTS

| | | |
|---|---|---|
| 1,133,503 | Ralston | Mar. 30, 1915 |
| 2,811,393 | Little | Oct. 29, 1957 |